US008967590B2

(12) United States Patent
Minervini et al.

(10) Patent No.: US 8,967,590 B2
(45) Date of Patent: Mar. 3, 2015

(54) MICRO-POWER GENERATOR FOR VALVE CONTROL APPLICATIONS

(75) Inventors: Leo Minervini, Paramus, NJ (US); William D. Ferraz, Setaozinho (BR)

(73) Assignee: Westlock Controls Corporation, Saddle Brook, NJ (US)

( * ) Notice: Subject to any disclaimer, the term of this patent is extended or adjusted under 35 U.S.C. 154(b) by 139 days.

(21) Appl. No.: 13/038,116

(22) Filed: Mar. 1, 2011

(65) Prior Publication Data

US 2011/0215268 A1 Sep. 8, 2011

Related U.S. Application Data

(60) Provisional application No. 61/309,604, filed on Mar. 2, 2010.

(51) Int. Cl.
*F16K 31/02* (2006.01)
*F01D 15/00* (2006.01)
*F01D 15/10* (2006.01)

(52) U.S. Cl.
CPC ................ *F01D 15/00* (2013.01); *F01D 15/10* (2013.01); *F05D 2220/62* (2013.01); *F05D 2220/20* (2013.01); *F05D 2250/82* (2013.01)
USPC .................... 251/129.04; 251/30.05; 310/119

(58) Field of Classification Search
USPC ......... 137/487.5; 251/30.05, 129.04; 310/119
See application file for complete search history.

(56) References Cited

U.S. PATENT DOCUMENTS

| | | | | | |
|---|---|---|---|---|---|
| 4,838,310 | A | * | 6/1989 | Scott et al. | 137/624.14 |
| 4,901,758 | A | * | 2/1990 | Cook et al. | 137/487.5 |
| 5,427,350 | A | * | 6/1995 | Rinkewich | 251/30.01 |
| 5,538,036 | A | * | 7/1996 | Bergamini et al. | 137/552 |
| 5,558,115 | A | * | 9/1996 | Lenz et al. | 137/86 |
| 6,178,997 | B1 | * | 1/2001 | Adams et al. | 137/487.5 |
| 6,913,203 | B2 | * | 7/2005 | DeLangis | 236/12.12 |
| 6,917,858 | B2 | * | 7/2005 | Boger | 700/282 |
| 7,121,495 | B2 | * | 10/2006 | Caamano | 242/390.5 |
| 8,016,262 | B2 | * | 9/2011 | Maercovich | 251/129.03 |
| 2006/0119202 | A1 | | 6/2006 | Kataoka et al. | |
| 2007/0074767 | A1 | * | 4/2007 | Roffey | 137/487.5 |
| 2007/0284552 | A1 | * | 12/2007 | Khorshid | 251/129.04 |
| 2009/0090880 | A1 | | 4/2009 | Dolenti et al. | |

(Continued)

OTHER PUBLICATIONS

Jan Peirs, Dominiek et al, "A Microturbine for Electric Power Generation"—MME'02, The 13th Micromechanics Europe Workshop, Oct. 6-8, 2002, Sinaia, Romania.
Sood, Rajendra K., "Piezoelectric Micro Power Generator (PMPG): A MEMS-Based Energy Scavenger", (Thesis) Dept. of Electrical Engineering and Computer Science, MIT, Sep. 2003.

(Continued)

*Primary Examiner* — Matthew W Jellett
(74) *Attorney, Agent, or Firm* — Quarles & Brady LLP

(57) ABSTRACT

A micro-power generator is integrated in a pneumatic valve controller, such that the micro-power generator is powered by the same compressed air supply used to operate the valve. The micro-power generator includes a micro-turbine connected to a DC power generator, and a source of compressed air is used to drive the micro-turbine to generate power via the generator. The system may include a valve controller pneumatically connected to the compressed air supply. The valve controller may include electronics for displaying a condition of the controller. The system can include an electronic field device in communication with the valve controller for displaying a condition of the valve controller. The micro-turbine generator can be electrically connected to the field device to provide power to the electronic field device. Other embodiments are disclosed and claimed.

10 Claims, 4 Drawing Sheets

(56) References Cited

U.S. PATENT DOCUMENTS

| | | | | |
|---|---|---|---|---|
| 2009/0200805 | A1 | 8/2009 | Kim et al. | |
| 2009/0293496 | A1 | 12/2009 | Norris et al. | |
| 2010/0005808 | A1 | 1/2010 | Nanataki et al. | |
| 2011/0132363 | A1 * | 6/2011 | Chalvignac | 128/204.21 |

OTHER PUBLICATIONS

Arnold, et al., "Microfabricated High-Speed Axial-Flux Multiwatt Permanent-Magnet Generators—Part II: Design, Fabrication, and Testing," J. Microelectromechanical System, 15(5) Oct. 2006, 1351-1363.

* cited by examiner (*) – MTG assembled inside the Positioner

MICRO-POWER GENERATOR FOR VALVE CONTROL APPLICATIONS

CROSS-REFERENCE TO RELATED APPLICATIONS

This is a non-provisional of pending U.S. provisional patent application Ser. No. 61/309,604, filed Mar. 2, 2010, the entirety of which application is incorporated herein by reference.

FIELD OF THE INVENTION

Embodiments of the invention generally relate to the field of valve controls, and more particularly to the field of micro-turbine power generation for enhancing functionality of valve control devices.

DISCUSSION OF RELATED ART

Many current valves are driven open and closed by pneumatic actuators. To be operable, such actuators require a continuous supply of compressed air. When such valves are addressed to be part of an automatic control loop (i.e., to support process automation), the valves are controlled (positioned) by means of valve positioners or solenoid valves called control devices.

Control devices are used to open, close or modulate the position of the valve to which they are attached. In most cases these control devices are electronic, and thus they need a source of electric power to operate. This presents a challenge because the biggest markets for such automatically-controlled valves are the oil & gas, petrochemical and chemical industries which are often located in hazardous and/or difficult to reach areas. This imposes severe limitations in the accessibility to the electronic device as well the supply of power to the device.

With a lack of a sufficient power supply, it is difficult to build control devices (as well as other types of field devices) with a large amount of functionality. For instance, many field devices don't have the same capabilities that can be found in a cell phone such as full-color graphic displays, large amount of RAM, etc. Thus, there is a need for an improved device for powering valve controllers in a variety of operating environments to provide enhanced functionality.

SUMMARY OF THE INVENTION

The disclosed device is a micro-power generator integrated in a pneumatic valve controller, such that the micro-power generator is powered by the same compressed air supply used to operate the valve. The result is a highly reliable source of electric power that can be used to provide increased functionality for field devices used in a variety of applications, including hazardous and classified applications.

In one embodiment, the micro-power generator includes a micro-turbine connected to a small DC power generator, and a source of compressed air is used to drive the micro-turbine to generate power via the generator. The disclosed arrangement can mitigate some of the aforementioned limitations associated with prior valve control devices.

A system is disclosed for supplying power to a valve control system. The system comprises a compressed air supply and a valve controller that is pneumatically connected to the compressed air supply. The valve controller may also have electronics for displaying a condition of the controller. A main power supply provides electric power to the electronics of the valve controller. The system also includes an electronic field device in communication with the valve controller for displaying a condition of the valve controller. The system further comprises a micro-turbine generator pneumatically connected to the compressed air supply. The micro-turbine generator is configured to convert power from the compressed air supply to electric power. The micro-turbine generator is also electrically connected to the field device to provide power to the electronic field device.

A method is disclosed for supplying power to a valve control device. The method may include providing a compressed air supply to a valve controller having electronics for displaying a condition of the controller; providing electric power to the electronics; displaying a condition of the valve controller using an electronic field device in communication with the valve controller; converting power from the compressed air supply to electric power using a micro-turbine generator pneumatically connected to the compressed air supply; and providing the electric power to the electronic field device.

BRIEF DESCRIPTION OF THE DRAWINGS

The accompanying drawing illustrates an exemplary embodiments of the disclosed device so far devised for the practical application of the principles thereof, and in which.

DESCRIPTION OF EMBODIMENTS

The disclosed system employs supplemental power generated by a micro-power generator (often called a micro-turbine generator (MTG)) that is powered by the same source of compressed air that is used to operate the pneumatic valve with which it is associated. The MTG provides additional power to any of a variety of field devices. This additional power is provided in parallel with a main power supply, and remains separate from the main power supply.

Figure 1:
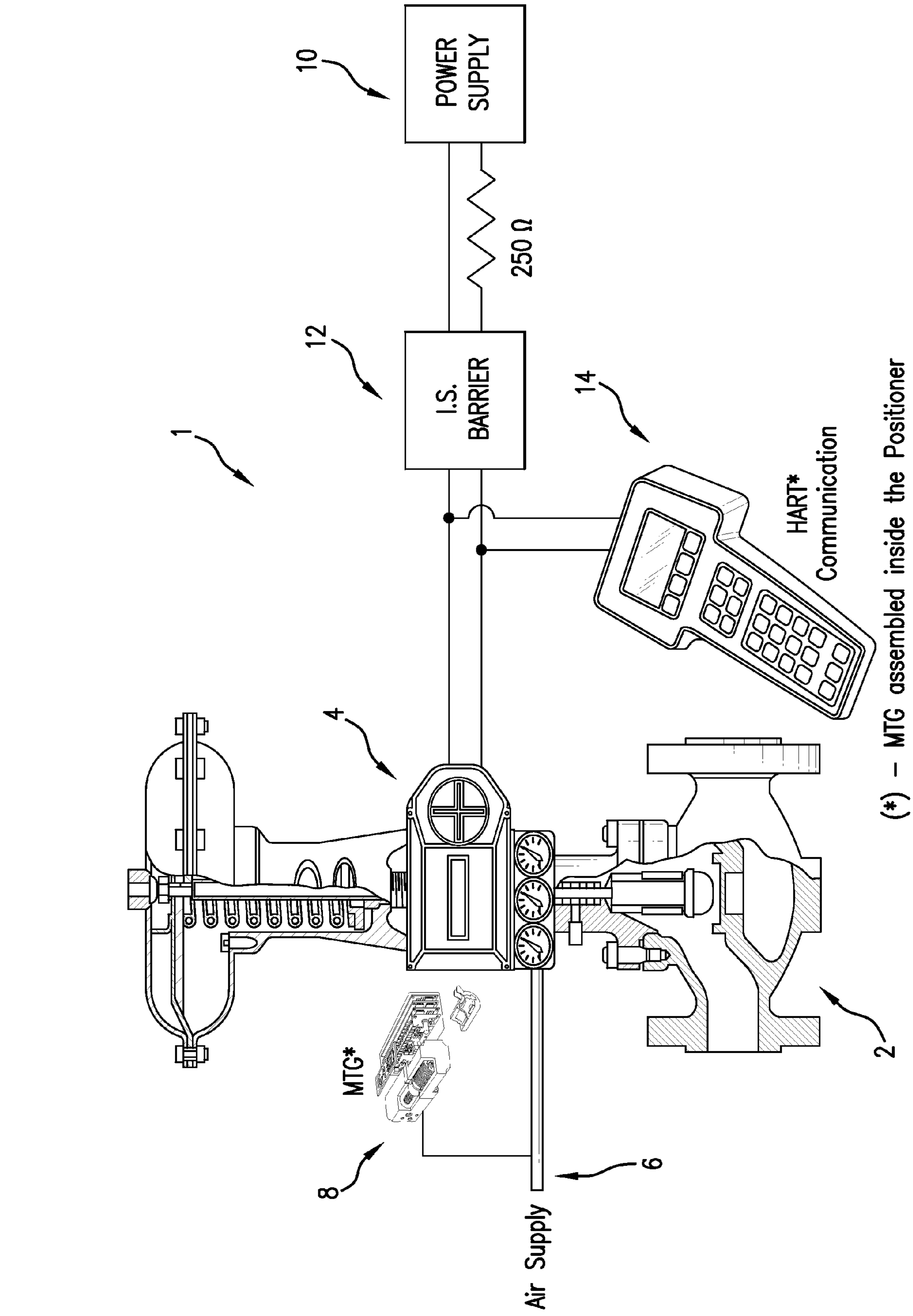
FIG. 1 is a schematic of a valve control system incorporating the disclosed micro-power generator.

Referring to FIG. 1, a valve control system 1 is shown including a pneumatically operated globe valve 2, a pneumatic valve controller 4, a compressed air supply 6 for operating the pneumatic valve controller, an MTG 8 connected to the compressed air supply, a main power supply 10, an intrinsic safety (IS) barrier 12, and a field device 14. It will be appreciated that the IS barrier 12 may not be required in all applications, but is normally required for hazardous environment applications.

The main power supply 10 and MTG are connected to the field device 14, which in one embodiment is a field communicator running on Windows. The field device 14 may have a variety of features, such as a color backlight display, a touch sensitive screen with on-screen buttons, and physical navigation buttons. Other functionality may also be provided in the field device 14. In the illustrated embodiment, the MTG 8 is located inside the valve controller 4. Currently there are no such devices with an embedded MTG. It will be appreciated, however, that the MTG could be provided elsewhere if desired.

Figure 2:
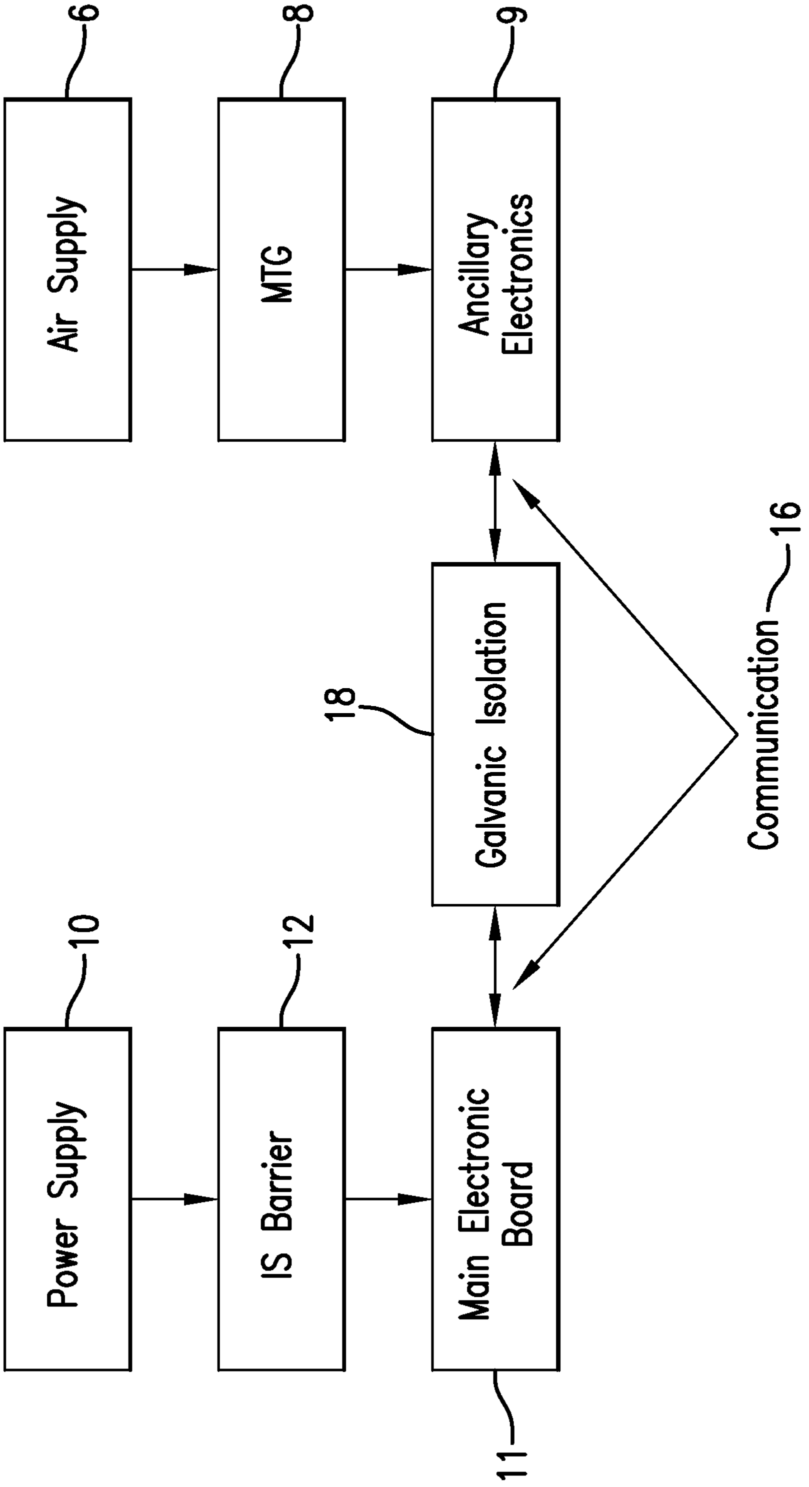
FIG. 2 is a block diagram of the system FIG. 1.

FIG. 2 is a block diagram showing the interconnection of the components of the system of FIG. 1. Air supply 6 is pneumatically connected to the MTG, which in turn is electrically connected to one or more ancillary electronics 9. In one embodiment, the ancillary electronics include a field communicator 14 having the functionality described in relation to the system of FIG. 1. A main power supply 10 provides electric power to a main electronic board 11 of the valve controller 4. The main electronic board 11 and the ancillary electronics 9 may be connected via a communications link 16, which may be a hardwired or wireless link. The communications link 16 may provide galvanic isolation 18 between the ancillary electronics and the main electronic board.

Figure 3:
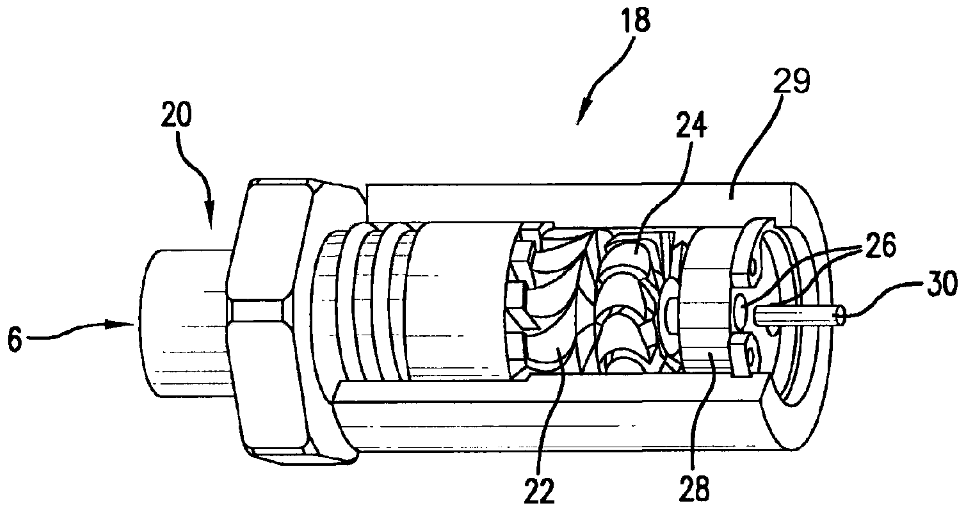
FIG. 3 is a cutaway view of a micro-turbine generator for use in the system of FIG. 1.
Figure 4:
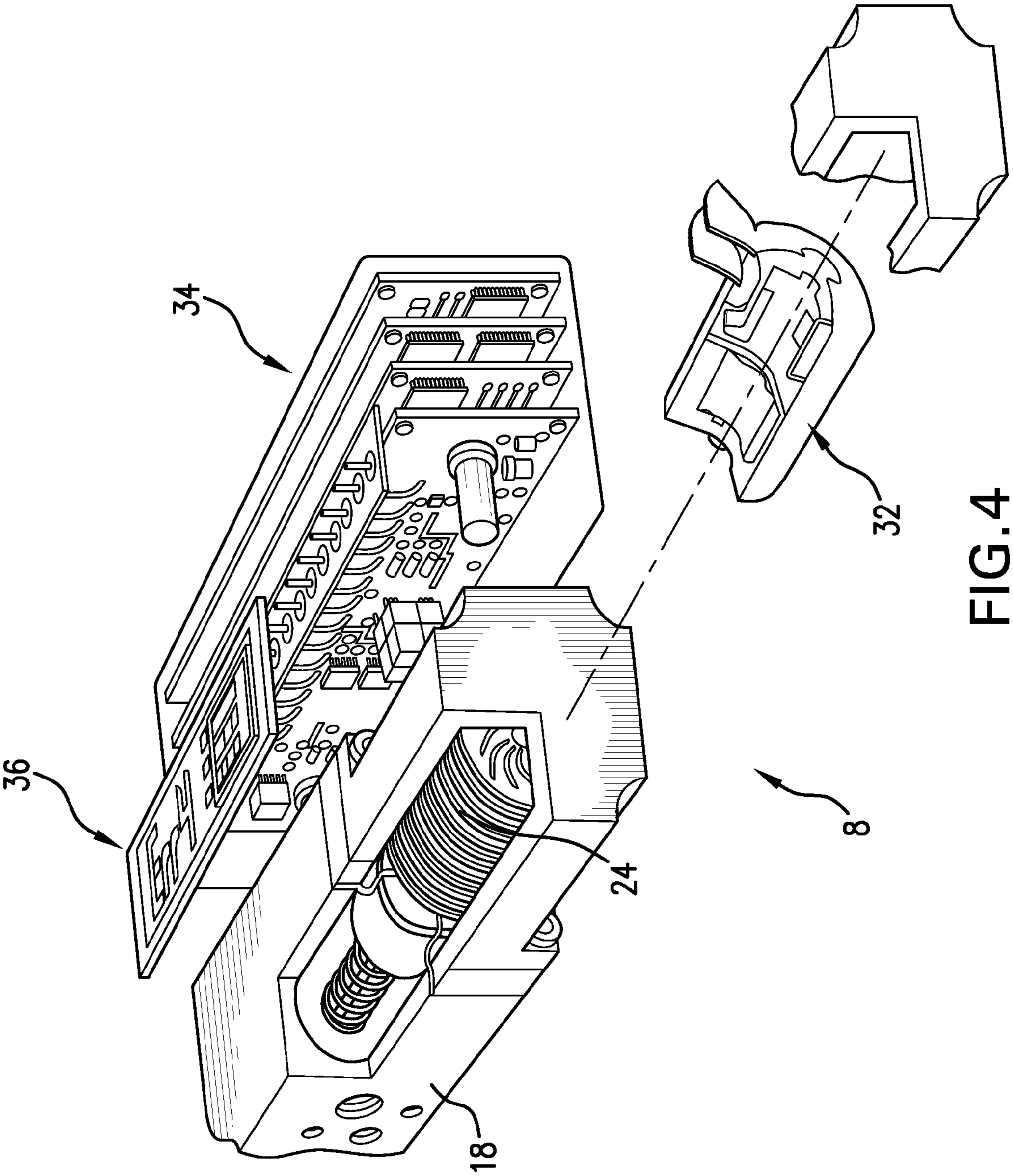
FIG. 4 is a cutaway view of the micro-power generator of FIG. 3 installed in an exemplary spool valve.

FIG. 3 shows an exemplary micro-turbine assembly 18 for use in the MTG 8 of FIGS. 1 and 2. As will be appreciated, the micro-turbine assembly 18 operates to convert energy from the compressed air supply into rotational motion which, in turn, rotates a shaft which can be connected to a small DC motor. Thus, air from the compressed air supply 6 enters the assembly 18 via a pneumatic connector 20 and expands over a set of stationary nozzles 22, where it is deflected in a direction tangential to a turbine rotor 24. After the air passes the rotor 24, it leaves through openings 26 in an outlet disc 28. A housing 29 contains the aforementioned parts. A shaft 30 may transmit the rotational motion of the turbine rotor 24 to a DC generator 32 (FIG. 4). In one embodiment, the housing 29 has a diameter of about 15 millimeters (mm) and a length of about 25 mm. The MTG 8 can include the microturbine assembly 18 of FIG. 3, and is described in greater detail in Jan Peirs, Dominiek et al, "A Microturbine for Electric Power Generation"-MME'02, The 13th Micromechanics Europe Workshop, Oct. 6-8, 2002, Sinaia, Romania, the entirety of which publication is incorporated herein by reference. In an alternative embodiment, a simplified MTG 8 may comprise a small turbine blade (propeller) attached to a shaft of a brushless DC motor.

FIG. 4 shows an embodiment in which the micro-turbine assembly 18 of FIG. 3 is incorporated into an MTG 8 for integration into the valve controller 4 of FIG. 1. The MTG includes a DC generator 32 which converts the rotary motion of the turbine rotor to DC power. This power, in turn, is used to support an electronics package 34 associated with the valve controller 4. As can be seen, the electronics package 34 includes a display 36. Additional power from the DC generator 32 can be provided to one or more field devices (see FIG. 1). An advantage of the disclosed system is that it is used in parallel with an existing main power supply, and thus the valve control device and field devices will not lose power even if the air supply is interrupted. The MTG 8 is beneficial for us in parallel with the main power supply so the MTG could supply power to additional RAM (which has been critical in HART devices) and more powerful LCDs, being possible to enable back-light, for instance.

In a further alternative embodiment, the MTG can be connected to a battery or super-capacitor to store power for later use in powering wireless control devices if the air supply is interrupted.

While the present invention has been disclosed with reference to certain embodiments, numerous modifications, alterations and changes to the described embodiments are possible without departing from the spirit and scope of the invention, as defined in the appended claims. Accordingly, it is intended that the present invention not be limited to the described embodiments, but that it has the full scope defined by the language of the following claims, and equivalents thereof.

What is claimed is:

1. A system for supplying power to a pneumatically operated valve, the system connected to a compressed air supply and connected to a main power supply that is separate from the compressed air supply, the compressed air supply operating the pneumatically operated valve, the system comprising:

a valve controller coupled to the pneumatically operated valve and pneumatically connected to the compressed air supply, the valve controller having electronics for displaying a condition of the valve controller, the electronics receiving electric power from the main power supply;

an electronic field device separate from the valve controller and including a backlit display, the electronic field device in communication with the valve controller for displaying the condition of the valve controller;

a micro-turbine generator integrated into the valve controller and pneumatically connected to the compressed air supply, the micro-turbine generator configured to convert power from the compressed air supply to electric power and deliver electric power to at least one of the valve controller and the electronic field device in parallel to the main power supply;

a communications link connecting the electronic field device and the valve controller and providing galvanic isolation therebetween, wherein the main power supply is capable of operating the system in the event of compressed air supply interruption.

2. The system of claim 1, the micro-turbine generator including a set of stationary nozzles, a turbine rotor, an outlet disc, and a shaft for transmitting rotational motion of the turbine rotor to a DC generator.

3. The system of claim 2, wherein power from the DC generator is coupled to the electronic field device.

4. The system of claim 1, the micro-turbine generator contained in a housing having a diameter of about 15 millimeters (mm) and a length of about 25 mm.

5. The system of claim 1, wherein the micro-turbine generator is coupled to a battery to store power.

6. The system of claim 1, wherein the micro-turbine generator is coupled to a super-capacitor to store power.

7. The system of claim 1, further comprising an intrinsic safety barrier arranged between the main power supply and the valve controller.

8. The system of claim 1, wherein the electronics include a controller backlit display.

9. The system of claim 1, wherein the communications link is hardwired.

10. The system of claim 1, wherein the communications link is wireless.

* * * * *